(12) United States Patent
Brain

(10) Patent No.: US 9,661,840 B1
(45) Date of Patent: May 30, 2017

(54) ROTATING DECOY CAROUSEL

(71) Applicant: Joseph Anthony Brain, Sonoma, CA (US)

(72) Inventor: Joseph Anthony Brain, Sonoma, CA (US)

(*) Notice: Subject to any disclaimer, the term of this patent is extended or adjusted under 35 U.S.C. 154(b) by 106 days.

(21) Appl. No.: 14/545,316

(22) Filed: Apr. 21, 2015

(51) Int. Cl.
*A01M 31/06* (2006.01)
*F16M 11/18* (2006.01)
*H02S 40/38* (2014.01)

(52) U.S. Cl.
CPC ............ *A01M 31/06* (2013.01); *F16M 11/18* (2013.01); *H02S 40/38* (2014.12)

(58) Field of Classification Search
CPC .................................................. A01M 31/06
USPC .......................................................... 43/3, 2
See application file for complete search history.

(56) References Cited

U.S. PATENT DOCUMENTS

| 2,547,286 | A | * | 4/1951 | Sabin | A01M 31/06 43/3 |
| 2,726,469 | A | * | 12/1955 | Becker | A01M 31/06 43/3 |
| 4,322,908 | A | * | 4/1982 | McCrory | A01M 31/06 43/3 |
| 6,079,140 | A | * | 6/2000 | Brock, IV | A01M 31/06 43/3 |
| 6,834,458 | B1 | * | 12/2004 | Hand, III | A01M 31/06 43/2 |
| 6,907,688 | B2 | * | 6/2005 | Brint | A01M 31/06 43/2 |
| 7,043,865 | B1 | * | 5/2006 | Crowe | A01M 31/06 43/3 |
| 7,137,221 | B2 | * | 11/2006 | Highby | A01M 31/06 43/2 |
| 7,322,144 | B2 | * | 1/2008 | Brewer | A01M 31/06 43/3 |
| 7,434,347 | B1 | * | 10/2008 | Powell | A01M 31/06 43/3 |
| 7,536,823 | B2 | * | 5/2009 | Brint | A01M 31/06 43/3 |
| 7,788,840 | B2 | * | 9/2010 | Wyant | A01M 31/06 43/3 |
| 8,256,155 | B1 | * | 9/2012 | Goodwill | A01M 31/06 43/3 |
| 8,484,883 | B2 | * | 7/2013 | Rogers | A01M 31/06 43/2 |

(Continued)

*Primary Examiner* — Darren W Ark
(74) *Attorney, Agent, or Firm* — Ristro A. Rinne, Jr.

(57) ABSTRACT

An apparatus for attracting animals includes a rotating carousel on a base. A bearing attached to the base supports a rotating shaft. A rotating upper plate is attached to an upper end of the shaft. One or more curved members extend outward from the upper plate and each supports at least one decoy. Placement of the decoys at varying elevations and at varying distances away from a center provides a more realistic presentation and also helps provide unequal force in the wind, which along with use of the bearing, promotes rotation of the carousel in even a light breeze, thereby eliminating the need for a motor. A rotating battery is preferably included. The battery allows for integral wiring and the use of solar panels, which provide the additional benefit of acting as turbine blades to increase a rotational force, thereby allowing the carousel to rotate in lighter wind/breeze conditions.

6 Claims, 2 Drawing Sheets

(56) References Cited

U.S. PATENT DOCUMENTS

| | | | | |
|---|---|---|---|---|
| 8,950,103 | B2* | 2/2015 | Bullerdick | A01M 31/06 43/3 |
| 9,402,385 | B2* | 8/2016 | Franklin | A01M 31/06 |
| 2003/0196367 | A1* | 10/2003 | Powell | A01M 31/06 43/3 |
| 2015/0181861 | A1* | 7/2015 | Butz | A01M 31/06 43/2 |
| 2016/0219867 | A1* | 8/2016 | Schauer | A01M 31/06 |
| 2016/0242409 | A1* | 8/2016 | Beauchamp | A01M 31/06 |

* cited by examiner

ROTATING DECOY CAROUSEL

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to the use of decoys to attract animals and, more particularly, to the attraction of birds.

Hunters have long employed decoys to attract ducks, geese and other waterfowl. Decoys may also be used to attract other species of birds and even other types of animals.

For decoys to effectively lure the quarry animal close-enough to be taken by the hunter it must appear realistic. This has created a need for ever more realistic looking ways of presenting decoys.

In particular, the old static decoys that are placed on the ground and which do not move offer relatively little attraction. Savvy birds may well avoid them or not respond to decoy sounds that may also be utilized. Therefore, there has been a tendency to animate decoys in order to make them appear ever more lifelike.

One such approach placed the wings of the decoy on a shaft that was free to rotate. By designing a curvature to the wings they could function similar to that of a wind turbine and rotate when placed in the wind. This added to their realism but the wings would not rotate during more gentle breezes.

To overcome this deficiency, an electric motor was added inside the decoy along with interchangeable batteries that were used to drive the wings and rotate them under electrical power. While this worked the batteries did not last sufficiently long. Replacement of the batteries in the field necessitated that the hunter or hunters emerge from their place of hiding, which was not ideal as it could frighten the quarry instead of attracting the quarry. Replacement of these disposable batteries is also expensive.

Therefore, a need remains to provide electrical power to motorized decoys that lasts a significantly longer amount of time. Ideally, a rechargeable battery of sufficient capacity could be used. However, it cannot then readily fit inside of a decoy. Furthermore, the rechargeable battery cannot be placed on the ground if the decoy were to be attached to a rotating carousel.

There is also a continuing need to prolong the life of any rechargeable battery, if one were provided, when in the field, during hunting. Ideally, the battery could be recharged while in the field.

There is also a need to present decoys to wildlife in a more realistic manner. This means providing additional motion. For example, when several ducks are landing they may be circling as they descend. Therefore, there is a need to replicate this behavior by providing a carousel that can rotate in gentle breezes or stronger winds that resembles two or more birds that are circling as they descend.

There is also a need to provide a rotating carousel that can be used to mimic the motion and behavior of other types of birds. For example, there is a need to mimic the circling behavior of adult male turkeys as they confront each other on the ground, challenging one-another for dominance and the right to breed.

There is also a need for readily interchangeable decoys of different species for use on a rotating carousel. In this manner the hunter could replace whatever species of decoy is on the carousel with whatever current species is being sought. This would allow the hunter to change the species to agree with different game animals and the local laws whereby the presentation is matched with the desired species for use during the active hunting season for that particular species.

There is a need for a rotating carousel that provides the above benefits and which more effectively uses the wind. Ideally, the rotating carousel would include wind-capturing means to help it to rotate in minimal winds. This is desirable as it would appear more natural and quiet than if a motor were used. It would also be lighter to transport.

There is a need for a rotating carousel that is supported by a bearing that permits easy rotation to occur with minimal resistance.

There is also an additional need that the carousel could include an optional electric drive motor that is capable of rotating the carousel when there is no wind or breeze.

There is an additional further need for a rotating carousel that can be disassembled for easy transport to and from the hunting area.

Accordingly, there exists today a need for a rotating decoy carousel that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such an apparatus would be useful and desirable.

2. Description of Prior Art

Decoy presentation devices are, in general, known. For example, the following patent documents describe various types of these devices, some of which may have some degree of relevance to the invention. Other patent documents listed below may not have any significant relevance to the invention. The inclusion of these patent documents is not an admission that their teachings anticipate any aspect of the invention. Rather, their inclusion is intended to present a broad and diversified understanding regarding the current state of the art appertaining to either the field of the invention or possibly to other related or even distal fields of invention.

U.S. Pat. No. 8,484,883 to Rogers, that issued on Jul. 16, 2013;

U.S. Pat. No. 8,316,575 to Bradley, that issued on Nov. 27, 2012;

U.S. Pat. No. 8,256,155 to Goodwill, et al., that issued on Sep. 4, 2012;

U.S. Pat. No. 7,937,881 to Price, that issued on May 10, 2011;

U.S. Pat. No. 7,788,840 to Wyant, et al., that issued on Sep. 7, 2010;

U.S. Pat. No. 7,536,823 to Brint, that issued on May 26, 2009;

U.S. Pat. No. 7,434,347 to Powell, that issued on Oct. 14, 2008;

U.S. Pat. No. 7,137,221 to Highby, et al., that issued on Nov. 21, 2006;

U.S. Pat. No. 6,907,688 to Brint, that issued on Jun. 21, 2005;

U.S. Pat. No. 6,574,904 to Fencel, et al., that issued on Jun. 10, 2003;

U.S. Pat. No. 6,430,863 to Krag, that issued on Aug. 13, 2002;

U.S. Pat. No. 5,144,764 to Peterson, that issued on Sep. 8, 1992;

U.S. Pat. No. 4,322,908 to McCrory, that issued on Apr. 6, 1982; and

U.S. Pat. No. 2,547,286 to Sabin, that issued on Apr. 3, 1951. Including U.S. Design Patent:

U.S. Design Pat. No. D671,187 to Saringer, that issued on Nov. 20, 2012.

And including U.S. Patent Application Publication:

U.S. Patent Application Publication No. 2013/0104443 to Cramer that was published on May 2, 2013.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a rotating decoy carousel that can accept one or more decoys attached thereto.

It is also an important object of the invention to provide a rotating decoy carousel that can accept one more decoys that are detachably-attachable.

Another object of the invention is to provide a rotating decoy carousel that includes one or more arms that extend outward from a central rotating base assembly.

Still another object of the invention is to provide a rotating decoy carousel that can accept decoys of any desired species.

Still yet another object of the invention is to provide a rotating decoy carousel that can present the decoys at different elevations and at different distances away from a center of the carousel.

Yet another important object of the invention is to provide a rotating decoy carousel that can present the decoys at identical elevations ranging from just above a ground surface to as high as is desired.

Still yet another important object of the invention is to provide a rotating decoy carousel that can accept one or more decoys simultaneously.

A first continuing object of the invention is to provide a rotating decoy carousel that is able to accept a wide variety of existing prior art decoys as well as new decoys that may be manufactured for use with the carousel.

A second continuing object of the invention is to provide a rotating decoy carousel that can be quickly and easily assembled or disassembled and which, after disassembly, is compact for transportation.

A third continuing object of the invention is to provide a rotating decoy carousel that is able to use a single sufficiently large rechargeable battery and eliminate reliance upon a plurality of batteries that are housed within a body of the decoys.

A fourth continuing object of the invention is to provide a rotating decoy carousel that is able to accept a single large rechargeable battery on an upper plate and permit rotation of the battery along with rotation of the carousel.

A fifth continuing object of the invention is to provide a rotating decoy carousel that includes a rotating battery on a rotating upper plate and which permits wiring to occur from the battery to one or more decoys that are disposed away from the battery and supported by members that are each attached at a lower or first end of the members to the upper plate.

Briefly, a rotating decoy carousel that is constructed in accordance with the principles of the present invention has a base assembly with legs that is placed on the ground or in the water. A bearing attached to an upper portion of the base assembly supports a vertical shaft that is able to rotate about a center longitudinal axis. An upper plate is attached to an upper end of the shaft. One or more curved members are secured to the upper plate at a first end of the curved members and extend outward. The curved members may include any desired rise or fall in elevation with respect to the upper plate and they may extend outward any desired distance. Means for attaching a decoy to the curved members is provided at an opposite second end of each of the curved members. One or more decoys are used. The decoys can be passive, having no inherent motion other than that provided by the rotating shaft, upper plate, and the curved member(s). Alternately, the decoys may include wings that move by wind activation or by motor control. A rechargeable battery is placed on the upper plate. Accordingly, the battery is able to rotate along with the upper plate and all parts that are supported by the upper plate. This keeps position of the battery static with respect to the decoys and allows for wiring to occur between the battery and the decoys, thereby eliminating the need for discreet batteries in each of the decoys. It also allows for further innovation to occur because the battery is static as far as everything that rotates is concerned, including the use of rechargeable solar panels that double as wind turbine blades which help rotate the carousel in light breezes.

DETAILED DESCRIPTION OF THE INVENTION

Figure 1:
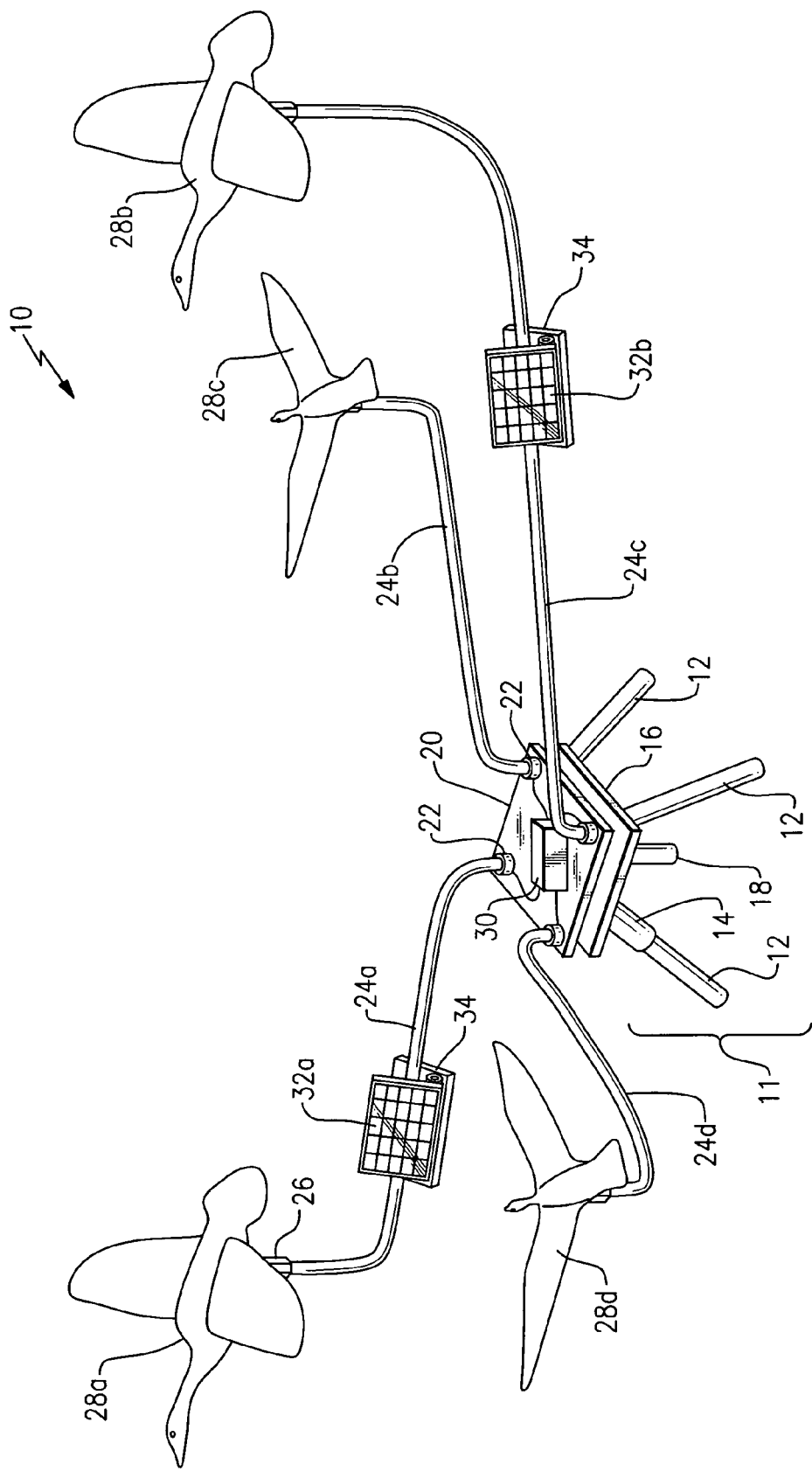
FIG. 1 is a view in perspective of a rotating decoy carousel.

Referring on occasion to all of the FIGURE drawings and now, in particular to FIG. 1, is shown a rotating decoy carousel, identified in general, by the reference numeral 10 and hereinafter referred to as the "carousel 10."

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

The carousel 10 includes a base assembly as shown by bracket 11. The base assembly 11 includes three or more legs 12. For most versions of the carousel 10 four legs 12 are preferred.

To facilitate transport of the carousel 10, each of the legs 12 is preferably detachable with respect to one of a plurality of sleeves 14. The number of sleeves 14 is equal to the number of legs 12. If four legs 12 are included, then four sleeves 14 to accept each of the four legs 12 would be included. The sleeves 14 include a hollow interior with a cross-sectional shape that is generally the same as that of the legs 12. The inside dimensions of the sleeves 14 exceed the exterior dimensions of the legs 12 by a sufficient margin to permit insertion of a top of each of the legs 12 into one of the sleeves 14.

The sleeves 14 extend over enough of the top of each of the legs 12 as is required to stabilize the leg 12 in position. The weight of the carousel 10 holds the sleeves 14 down, over the top portions of the legs 12 during use yet still allows for quick disassembly. If desired, means such as set screws could be used to secure each of the sleeves 14 to each of the legs 12. Disassembly of this portion of the carousel 10 is accomplished by pulling the legs 12 out of their respective sleeves 14, when desired for disassembly and transport.

Each of the sleeves 14 is attached to a lower plate 16. Attachment of the sleeves 14 to the lower plate 16 is by welding, screw threads, or any desired fastener(s) or other means. The lower plate 16 is disposed near a top portion of the base assembly 11.

Figure 2:
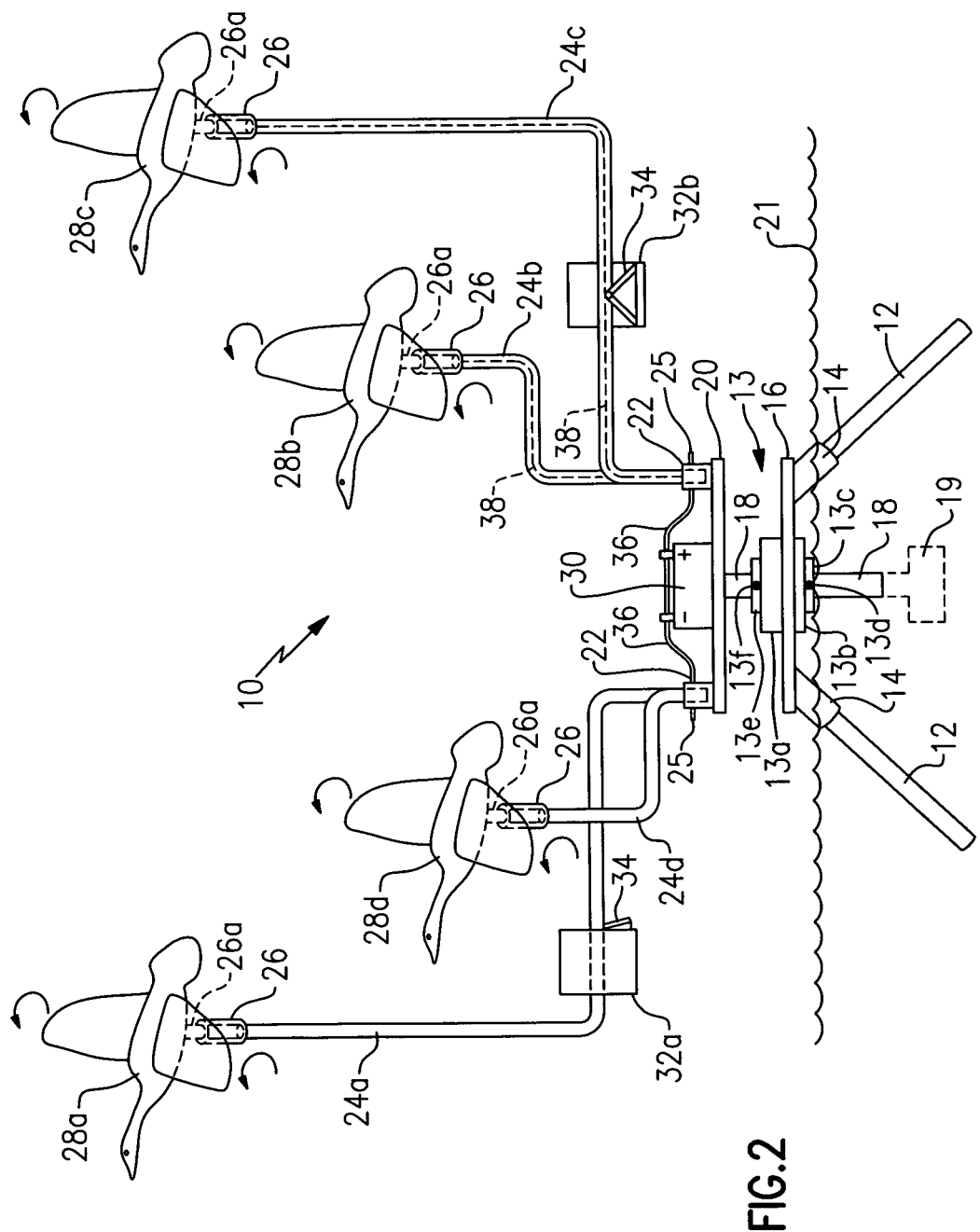
FIG. 2 is a side view of the rotating decoy carousel of FIG. 1 with a portion of base partially submerged in the water.

Referring now to FIG. 2, a thrust bearing, identified in general by the reference numeral 13 is shown. The thrust bearing 13 is attached by any preferred means near to or at the center of the lower plate 16. As shown the thrust bearing 13 extends through an opening provided in the lower plate 16. The thrust bearing 13 is welded to the lower plate 16 or secured by any preferred means. A shaft 18 that is supported by the thrust bearing 13 passes through the thrust bearing 13 and through the opening provided in the lower plate 16. The shaft 18 is able to rotate about its center longitudinal axis in either direction due to its contact with roller or ball bearings (not shown) that are disposed in the thrust bearing 13. The shaft 18 may extend any desired amount below or above the lower plate 16.

If desired, an optional motor 19 (shown in dashed lines) can be connected to the shaft 18 at a bottom of the shaft 18 or anywhere along the longitudinal length of the shaft 18 by gear, belt, frictional or any other desired means of engagement. If the motor 19 is included, a member (not shown) that attaches the motor 19 to a portion of the carousel 10 is required to prevent rotation of the motor 19.

As shown the thrust bearing 13 includes an upper portion 13a that is disposed above the lower plate 16 and a lower portion 13b that is disposed below the lower plate 16. A lower collet 13c with a lower set screw 13d secures the shaft 18 in position within the thrust bearing 13 by preventing upward movement of the shaft 18. An upper collet 13e with an upper set screw 13f secures the shaft 18 in position by preventing downward movement of the shaft 18. The set screws 13d, 13f engage with the shaft 18. The collets 13c, 13e rotate along with the shaft 18. Other types of bearings (not shown) are possible for use that allow rotation of the shaft 18 to occur and which prevent vertical movement of the shaft 18 from occurring with respect to the lower plate 16.

An upper plate 20 is attached to a top of the shaft 18 by any preferred means, such as by fastener or welding or screw threads. The upper plate 20 is able to rotate in unison with the shaft 18 relative to the lower plate 16, the sleeves 14 and the legs 12. Accordingly, the upper plate 20 and all parts of the carousel 10 attached to the upper plate 20 rotates in unison as the shaft 18 rotates.

If desired, the sleeves 14 could be eliminated and the legs 12 could be directly attached to a bottom (i.e., underside) of lower plate 16 by welding, screw threads, or by the use of any desired fastener or alternative means.

At least two but preferably three to five hollow interior attachment rings 22 are attached to an upper surface of the upper plate 20 by welding, screw threads, or by the use of any desired fastener or alternative means. A lower end of a curved member (four are shown and identified by the reference numerals 24a, 24b, 24c, 24d) is disposed in and attached to a respective one of the attachment rings 22 and secured in place by additional set screws 25 (FIG. 2).

The attachment rings 22 secure the curved members 24a-d in position during use and allow for removal of the curved members 24a-d for ease of transport.

Each of the curved members 24a-d preferably extends a different distance away from the base assembly 11 and each also preferably include a different amount of rise in elevation, as shown. Two or more of the curved members 24a-d may include the same rise in elevation, if desired.

The amount of rise in elevation is selected based on the species a decoy 28a, 28b, 28c, 28d is mimicking in appearance. This is discussed in greater detail below. In general, if the species of the decoy 28a, 28b, 28c, 28d is a waterfowl, like duck or geese as shown, a rotating cluster of the decoys 28a, 28b, 28c, 28d disposed at different elevations, each with different radius accurately resembles in appearance a group of waterfowl circling to land.

However, if the species of the decoy 28a, 28b, 28c, 28d being used included wild turkey (not shown), perhaps only two modified curved members (not shown) that are equal in rise of elevation might be used. It may be preferred both for dynamic balance and for appearance to place the two equal rise modified curved members and the two turkey decoys at the locations where the curved members 24a and 24c are presently shown. This would ensure that the two turkey decoys (not shown) are diametrically opposite with respect to each other. The rise in elevation may be minimal or even zero or may even include a slight fall in elevation to make it appear that the turkey decoys were disposed on or very close to the ground surface. As the carousel 10 rotated, it would appear that the two turkey decoys were chasing each other in a circular challenging manner, as they might do when challenging one-another during mating.

By selecting the species of decoy 28a-d, how many are used, and their rise in elevation, different visual presentations can be accomplished that are more realistic of activities particular to any given species and which would therefore be more likely to attract the type of quarry being sought.

Therefore, by choosing a desired species for the decoy (28*a-d* or any other species) and by selecting the other components of the carousel 10 accordingly, an optimum and more realistic appearance is provided that is more likely to attract the desired quarry.

Any desired species of bird can be used, for example, grouse decoys (not shown) could instead be used. If desired, any other type of decoy of any species, including species of animal other than birds, can be used.

The number of curved members 24*a-d* that are attached to the carousel 10 during use can be varied each time the carousel 10 is used. The maximum number of curved members 24*a-d* is determined by the number of attachment rings 22 that are attached to the upper plate 20.

As shown in the drawing figures, four of the curved members 24*a-d* are included, each with a different rise in elevation and each with a different radius away from the shaft 18.

Each of the curved members 24*a-d* includes an attachment adapter 26 disposed at an upper end thereof. Most of the attachment adapters 26 include a square or round hollow interior. The attachment adapters 26 are intended to receive a portion of a support post 26*a* (FIG. 2) that is attached to one of the decoys 28*a-d*. Generally, square posts prevent rotation of the decoy 28 *a-d* within the attachment adapter 26 while round posts permit rotation. If desired, additional set screws (not shown) may be used to prevent rotation with round posts. Currently manufactured decoys 28*a-d* are generally available with either round or square posts. If other posts (not shown) attached to other types of decoys (not shown) include a cross-sectional shape other than square of round, for example triangular, a different type of the attachment adapter 26 would be used.

The attachment adapters 26 may be permanently attached to the ends of the curved members 24*a-d* or they may be detachably-attachable with respect to the ends of the curved members 24*a-d* and secured, thereto, by screw threads, additional set screws, or by any other preferred fastener or means. If they are detachably-attachable, the attachment adapters 26 may be changed as desired to accommodate the cross-sectional shape of the support post 26*a* of the decoys 28*a-d*.

The legs 12 can be placed on dry land or in, and even submerged under water as shown by wavy line 21 (FIG. 2) which helps obscure the base assembly 11 and thereby increase efficacy of the carousel 10 in attracting ducks, geese or other type of quarry.

Even a slight breeze is sufficient to cause the shaft 18, the upper plate 20, the curved members 24*a-d* and the decoys 28*a-d* to rotate, which is useful in attracting ducks or other species of birds or wildlife. Differences in resistance on opposite sides of the carousel 10 are caused by differences in the placement and relative positioning of the decoys 28*a-d*, including different elevation of the decoys 28*a-d* or by different radius, as well as by variations in wind patterns. These differences in resistance create an imbalance of forces that causes the carousel 10 to rotate in the wind or even when a slight breeze is present.

It is important to note that any desired type of decoy 28*a-d* can be used with the carousel 10. Certain prior art versions of the decoy 28*a-d* include wings with a unique curvature that causes their wings to rotate around a center longitudinal axis by the action of wind, somewhat similar to that of a horizontal wind turbine. Other prior art versions of the decoy 28*a-d* include a motor and battery contained within the prior art decoy 28*a-d* to rotate the wings. The use of these prior art types of decoys 28*a-d* and the accompanying rotation of the wings, either by motor or by action of the wind is possible for use with the carousel 10.

Still, other types of prior art decoys 28*a-d* are entirely passive and exhibit no movement of the wings or they may be flexible to some degree and moved to a more limited degree by the wind. All prior art and future decoys 28*a-d* that include the support post 26*a* can be used with the carousel 10, as desired.

However, a problem with the battery operated prior art decoys 28*a-d* is that the batteries do not last for long and must often be replaced. There are numerous disadvantages to doing so in the field during use (i.e., hunting). In particular the hunter must abandon his or her blind (i.e., place of concealment) and venture out to the prior art decoys 28*a-d* in plain sight of the quarry. This can frighten the quarry and cause the quarry to flee the area which is opposite what is desired. Additionally, replacement batteries must be carried to the field and out of the field. These batteries are expensive to use and are typically not recharged.

If desired the upper plate 20 allows for the placement of a larger rechargeable type of battery 30 on top of the upper plate 20. The battery 30 can simply sit on the upper plate 20 or it can be secured to the upper plate 20 by any preferred type of member(s).

Electrical wiring 36 can be optionally included to extend from the battery 30 to an opening provided in each of the attachment rings 22. A sufficiently small first electrical connector (not shown) can be provided in each of the attachment rings 22 for ease of electrical connection. An electrical wire 38 (shown in dashed lines in FIG. 2) is optionally included inside each of the curved members 24*a-d*. Only two of the curved members 24*b*, 24*c* as shown, include the electrical wire 38. However, the electrical wire 38 is preferably included and available for use in all of the curved members 24*a-d*. A lower end of each of the electrical wires 38 includes a corresponding first electrical connector (not shown) that is able to mate with the first electrical connector in each of the attachment rings 22. It is also, of course, possible to allow a portion of the electrical wire 38 to extend out of an opening provided near the bottom of each of the curved members 24*a-d* and attach directly to the battery 30, thereby eliminating the need for the first electrical connectors and the corresponding first electrical connectors.

An opposite end of the electrical wires 38 includes a second electrical connector (not shown) for connection with a corresponding second electrical connector that is attached to each of the decoys 28*a-d*. Preferably, the decoys 28*a-d* would be modified to eliminate the internal batteries and to instead include a short wire that ran to an electrical motor in each of the decoys 28*a-d* that rotated their wings. The short wire would be electrically and mechanically attached to the corresponding second electrical connector. If desired, the short wire could be directed to pass through the support posts 26*a* of the decoys 28*a-d* for attachment to the second electrical connector. If desired electrical connection proximate the decoys 28*a-d* could occur externally, similar to that as described earlier for connection at the bottom of each of the curved members 24*a-d*.

The larger battery 30 allows for longer operational time and may be able to power the decoys 28*a-d* for much of the time spent hunting. If desired, optional on-off switches (not shown) could also be included in the decoys 28*a-d* or elsewhere, where desired on the carousel 10.

A further improvement to the carousel 10 is to include one or more solar panels 32*a*, 32*b* that are attached at a selected area of the curved members 24*a-d* (24*a* and 24*c*, as shown).

The solar panels 32a, 32b are electrically connected to the battery 30 which helps to recharge the battery 30 by the presence of ambient light and sunlight during hunting. This significantly helps maintain and extend the ability of the battery 30 to rotate the decoys 28a-d wings for an extended period of time.

However, a second unexpected benefit is also provided by the solar panels 32a, 32b. The solar panels 32a, 32b are preferably positioned on opposite or nearly opposite curved members 24a-d and with a desired tilt angle. If desired, an optional frame structure 34 is used to control the tilt angle. Preferably, the frame structure 34 allows field adjustment of the tilt angle.

During a breeze or wind, a greater force is exerted upon one of the solar panels 32a, 32b than the other depending on the tilt angle. In other words, one of the solar panels 32a, 32b is more effective at catching the wind while the remaining solar panel 32a, 32b is less effective. This increases the magnitude of force on one side of the carousel 10 more than on the other side, effectively turning the carousel 10 into a wind turbine. This allows the carousel 10 to rotate in even slower winds. If desired, an adjustable frictional brake (not shown) could be included to bear against the shaft 18 and slow down the rate of rotation during especially strong winds.

Accordingly, the solar panels 32a, 32b provide the unexpected benefit of helping to rotate the shaft 18, the upper plate 20, the curved members 24a-d, and the decoys 28a-d of the carousel 10 while simultaneously helping to charge the battery 30 and thereby also increasing the time the decoy's 28a-d wings are able to rotate.

During use, the base assembly 11, which includes the legs 12, the sleeves 14, the lower plate 16 and the thrust bearing 13, is stable and does not rotate. The shaft 18 and all that is supported by the shaft 18 forms the carousel 10 portion of the invention and rotates during use. The carousel portion is disposed above the base assembly 11. The carousel portion includes the upper plate 20, the attachment rings 22, the curved members 24a-d, the attachment adapters 26 and, if optionally included, the battery 30 and the solar panels 32a, 32b, the frame structures 34, the electrical wires 38, the first and second electrical connectors and the first and second corresponding electrical connectors, and the decoys 28a-d, including any component parts of the decoys 28a-d such as the support posts 26a and internal batteries or external decoys wires/connectors (not shown).

The components of the carousel 10 can be quickly and easily disassembled for compact storage in a vehicle (not shown) and for transport in one or more sacks (not shown) or other containers (not shown) to and from the hunting area. The carousel 10 is quickly and easily reassembled at the hunting area for use in any wind condition. If no wind is present, the optional motor 19 may be attached and energized, preferably, by the battery 30.

It is also possible to attach the frame of the motor 19 to the bottom of the shaft 18 and to secure a motor shaft to the base assembly 11. This would allow the frame of the motor 19 and electrical wiring 36 from the battery 30 to the motor 19 to rotate along with the carousel 10. It is also possible to connect the motor shaft to the shaft 18 and use a slip ring that is concentric with respect to the shaft 18 to supply power to the motor 19 from the battery 30.

If desired, new and further modified types of decoys (not shown) may be used with carousel 10 that are even more realistic. For example, the battery 30 can be used to power a rotating neck or head that bobs up and down to increase realism of a further modified novel decoy.

Also, any of the curved members 24a-d could be modified to each support more than one decoy at any desired elevation and also at any desired distance away from the upper plate 20. If desired, the preferred curvature presently included in the curved members 24a-d as shown, could be eliminated to provide one or more straight members (not shown).

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A rotating decoy carousel, comprising:
   (a) a base assembly for placement on a ground surface, wherein said base assembly includes a bearing attached to said base assembly;
   (b) a vertical shaft disposed in said bearing, wherein said shaft is supported by said bearing and is able to rotate about a central longitudinal axis of said shaft;
   (c) an upper plate attached to an upper end of said shaft;
   (d) one or more decoys;
   (e) means for detachably-attaching one or more decoys to said upper plate, wherein said means for detachably-attaching includes one or more members that are each attached at a first end thereof to said upper plate and wherein at least one of said one or more members includes an attachment adapter attached to an opposite second end of said at least one of said one or more members, and wherein said attachment adapter is able to receive a post that is attached to a bottom of at least one of said one or more decoys, and wherein said post is able to cooperate with said attachment adapter to secure said at least one of said one or more decoys to said second end of said at least one of said one or more members;
   (f) wherein said shaft, said upper plate, said one or more members, said means for detachably-attaching one or more decoys, and said one or more decoys form a rotating carousel assembly;
   (g) a battery disposed on said upper plate, said battery supplying electrical power to said at least one of said one or more decoys, wherein said battery is able to rotate in unison with said rotating carousel assembly; and
   (h) at least one solar panel attached to said at least one of said one or more members, wherein said at least one solar panel is electrically connected to said battery and wherein said at least one solar panel is able to supply an electrical charge to said battery, and wherein said at least one solar panel is attached to said at least one of said one or more members at a tilt angle sufficient for said at least one solar panel to assist in rotating said rotating carousel assembly in the presence of a wind.

2. The rotating decoy carousel of claim 1 including electrical wiring from said battery to said at least one of said one or more decoys, wherein a pair of wings of said at least one of said one or more decoys is able to rotate using electrical energy to drive an electrical motor disposed in said at least one of said one or more decoys.

3. The rotating decoy carousel of claim 2 wherein said electrical wiring is disposed within a hollow interior of said at least one of said one or more members.

4. The rotating decoy carousel of claim 1 wherein said attachment adapter is detachably-attachable with respect to said second end of said at least one of said one or more members.

5. The rotating decoy carousel of claim 1 wherein said attachment adapter is fixedly attached to said second end of said at least one of said one or more members.

6. The rotating decoy carousel of claim 1 including a frame structure attached to said at least one of said one or more members, wherein said frame structure is able to help support and to control said tilt angle of said at least one solar panel.

\* \* \* \* \*